Feb. 24, 1959  J. N. MATHESON  2,874,693
RESPIRATOR

Filed Jan. 14, 1955  2 Sheets-Sheet 1

INVENTOR.
JAMES N. MATHESON
BY
*William J. Ruano*
ATTORNEY

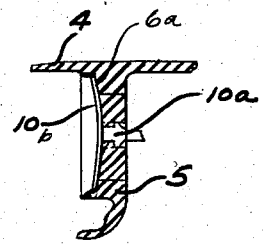 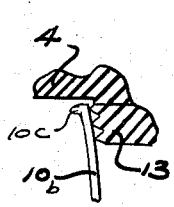 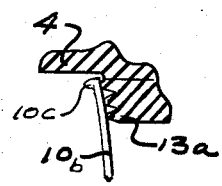
FIG 10   FIG 11   FIG 12
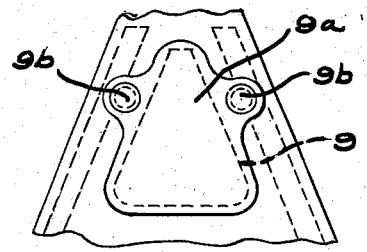 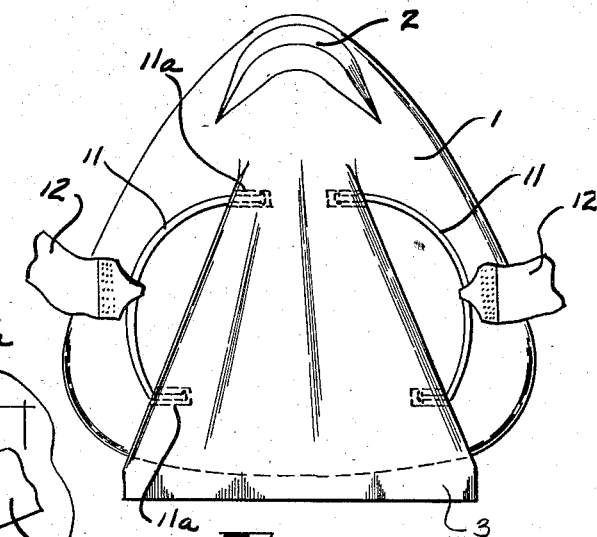
FIG 13   FIG 14
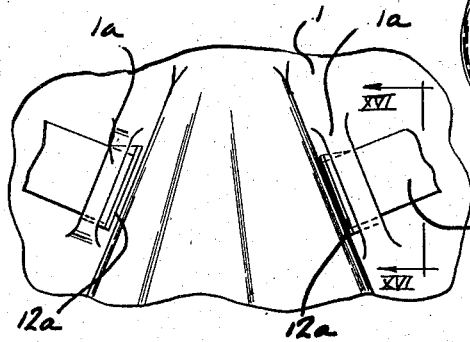
FIG 15
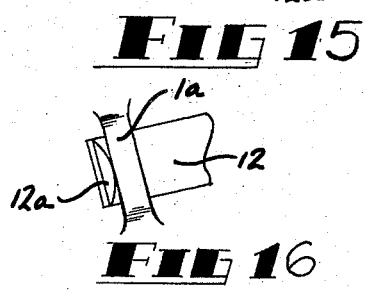 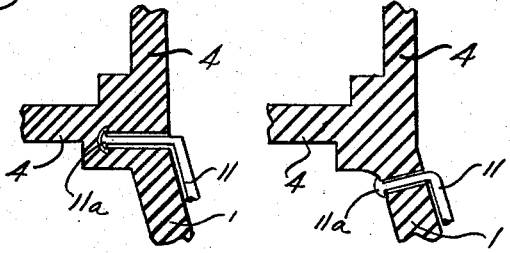
FIG 16   FIG 17   FIG 18
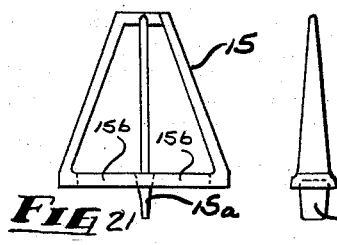 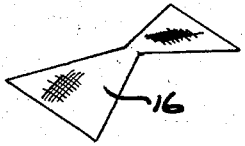
FIG 21   FIG 20   FIG 19
INVENTOR.
JAMES N. MATHESON
BY
William J. Ruano
ATTORNEY

United States Patent Office 2,874,693
Patented Feb. 24, 1959

2,874,693
RESPIRATOR

James N. Matheson, West Reading, Pa., assignor, by mesne assignments, to The Electric Storage Battery Company, Philadelphia, Pa., a corporation of New Jersey Application January 14, 1955, Serial No. 481,950

2 Claims. (Cl. 128—146)

This invention relates to improvements in industrial respirators and, more particularly, to a respirator of the type including a face piece encircling the nose, cheeks and chin of the wearer and including a filter housing for receiving a removable filter for protection against dust, fumes and certain noxious gases.

A common type of industrial respirator is one having a face piece having detachably secured thereto, by means of a seal, a separate filter box or holder for receiving a removable frame and filter. Such type of respirator has the outstanding disadvantage that the seal develops leaks as a consequence of frequent removal and attachment of the filter box with respect to the face piece, such as when the parts are to be cleaned. And even without such frequent detachment, slight imperfections in the manufactured parts cause leakage through the seal which renders the respirator ineffective to accomplish its main function of dust and fume filtration.

Certain well-known types of respirators include filter holders having open sides and bottom for receiving a removable filter and filter supporting frame. This type has the serious disadvantage that the filter must be very carefully centered and accurately positioned on the frame and within the holder or housing in order to provide an air tight joint along both side walls and along the bottom of the holder. The slightest lateral offset of the filter will cause serious leakage. It has been found that industrial workers, as they replace filters, frequently do not exercise a high degree of care in placement of the filter and often times, to save time, or through sheer carelessness, will replace filters either laterally offset slightly relative to the frame and holder, or with the bottom edge of the filter in improper relation with the frame so as to prevent a proper seal with the bottom opening of the filter housing, or perhaps will not push the frame inwardly enough into the holder, any of which will cause serious air leakage into the respirator without filtration, thus subjecting the wearer to the unsuspected danger of inhaling deleterious dust and fumes.

Another serious disadvantage of respirators having filter holders for receiving removable filters is that such holders are generally made of hard material, such as metal or hard plastic, therefore have no inherent tendency to compensate for irregularities of the filter and holding frame or their fit, therefore it is extremely difficult to maintain an air tight seal throughout the side and bottom openings of the filter holder or housing.

Still another disadvantage of common types of respirators is that they do not provide a truly comfortable fit about the nose, cheeks and chin of the wearer, particularly about the bony nasal portion which has a great tendency to become irritated, nor do they provide a comfortable fit on varying face contours and nose contours of different wearers, or when worn at different heights on the nose or when the headband position is changed in height behind the head. Nor is a perfect seal with the face of the wearer maintained under such varying conditions.

An object of my invention is to provide a novel respirator which is devoid of the above named disadvantages and which is molded in one piece and formed entirely of elastic or flexible material, therefore is devoid of any seal between the face piece and filter holder which might leak, also which is very inexpensive to manufacture, also which can be readily cleaned without detachment of parts and reassembly thereof.

A further object of my invention is to provide an industrial respirator comprising a face piece and filter holder, the latter having closed sides and an open bottom and being made of flexible material, such as rubber, and constructed so as to avoid the tendency of leakage through the sides and bottom as commonly occurs in known types of industrial respirators.

A further object of my invention is to provide a respirator face piece of such construction as to insure an air tight and extremely comfortable cushioned fit about the cheeks, nose and chin of the wearer irrespective of varying facial contours and nasal contours and irrespective of whether the respirator or headband is worn high or low.

Another object of my invention is to provide novel inhalation and exhalation valve constructions for reducing resistance to breathing and at the same time assuring an air tight seal.

Other objects and advantages of the present invention will become apparent from a study of the following description taken with the accompanying drawings wherein.

Figure 1:
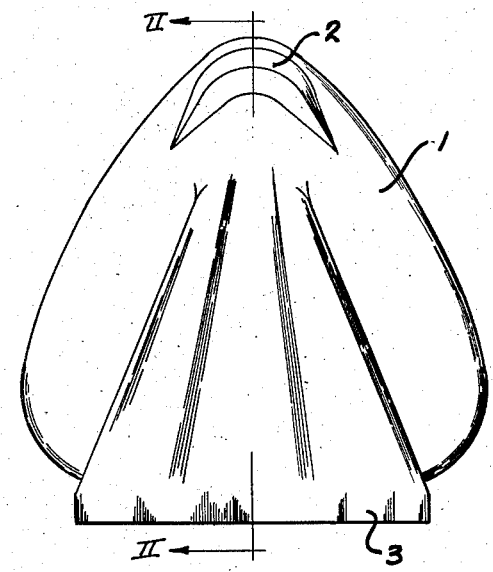
Figure 1 is a front elevational view of an industrial type respirator embodying certain features of the present invention.
Figure 2:
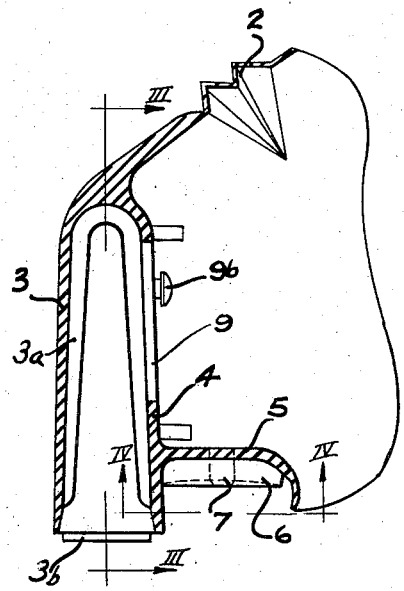
Figure 2 is a vertical cross-sectional view taken along line II—II of Figure 1.
Figure 5:
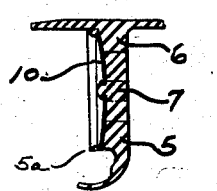
Figure 5 is a cross-sectional view taken through one of the two exhalation valves and along line V—V of Figure 4.

Figures 6, 7, 8 and 9 show various modifications of the accordion pleat 2 shown in Figures 1 and 2 for permitting forward pivotal movement of the top portion of the face piece so as to accommodate different nasal contours and provide an extremely comfortable fit about the nose;

Figure 10 is a cross-sectional view similar to Figure 5 but showing a modified form of exhalation valve;

Figures 11 and 12 are enlarged fragmentary cross-sectional views showing different types of multiple ring valve seats for the exhalation valve shown in Figure 10;

Figure 13 is a fragmentary view taken from the interior of the face piece of Figure 2 and showing the inhalation valve construction;

Figure 14 is a front elevational view of the respirator equipped with a self-aligning head band and wire attachment for securing an air tight fit regardless whether the head band is worn above or below the ears;

Figure 15 is a fragmentary front elevational view showing a modified type of self-aligning head band;

Figure 16 is a side fragmentary view of one of the head band attaching means shown in Figure 15;

Figures 17 and 18 are enlarged cross-sectional views showing two different constructions for sealing the ends of wires 11 of Figure 14 to the respirator;

Figure 19 is a perspective view of a butterfly shaped filter which is used in the previously described assembly, and Figure 20 is a side view and Figure 21 is a front view of the removable, filter holding frame showing the filter 16 removed therefrom.

Referring more particularly to Figures 1 and 2 of the drawings, numeral 1 denotes a respirator face piece of suitable flexible material, such as rubber, and molded of cup shape with a somewhat triangular or pear shaped outline so that the marginal edges of the mouth portion thereof will fit in an air tight manner about the nose, cheeks and chin of the wearer. It will be noted that the marginal edge of the mouth is outwardly turned and somewhat abruptly reduced in thickness at the extreme edge or perimeter of the face piece beginning $3/16''$ perpendicularly in from the peripheral edge shown in Fig. 2, tapering from a thickness of about $5/64''$ to one of about $1/32''$ or less so as to provide a readily yieldable, cushioned and extremely comfortable and air tight fit with the wearer's face irrespective of varying contours of the face and nose of different wearers. The thickness of the inclined portion of the face piece above the holder may be about $1/8''$ and that of the lower wall 5 about $5/64''$, however these dimensions may be varied.

One of the more sensitive portions of the wearer's face in wearing a respirator is the bony portion of the nose since even slight pressures cause irritation and discomfort. In view of this and in order to allow the face piece to be worn either high or low on the face or nose, also in order to make the upper portion of the face piece conform to varying nasal contours, an accordion double pleat 2 is provided which is considerably thinner than the adjoining forward portion of the respirator so that the pleats will readily flex about pivots on the sides of the respirators as shown. The radius of the outermost corners of the pleats may be of the order of 1 inch. The accordion pleats may be of the order of .025 inch in thickness as compared to the portion forward thereof which may be of the order of $1/8''$ in thickness. Thus, in mounting, when the face piece is placed against the wearer's face and the upper portion contacts the nose, the pleated portion will readily flex so as to pivot the top portion of the face piece forwardly and provide a readily yieldable, exceedingly comfortable, cushioned yet air tight fit about the nose of the wearer irrespective of different nasal contours of different wearers and regardless whether the face piece is worn high or low on the nose. This also permits adjustment for different types of glasses or goggles.

Figure 4:
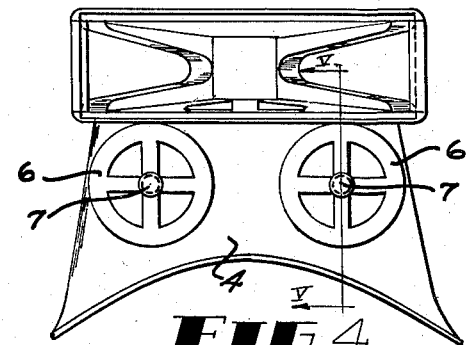
Figure 4 is a bottom view of the respirator shown in Figures 1 and 2 with the filter and holder assembly removed as well as the exhalation valve discs.

An important feature of the present invention resides in the fact that the respirator is so constructed as to enable it to be molded in one piece which results in many amazing and highly useful and improved features. That is, the respirator face piece 1 and filter holder or housing 3 are integrally molded as one piece and formed of rubber or other suitable flexible and elastic material, together with the rear wall 4 and lower wall 5 of the respirator. Also integrally molded with the respirator are the two exhalation valve seats 6, shown more clearly in Figure 4, as well as the inhalation valve seat 9 shown more clearly in Figure 13. Molding of the above mentioned parts as an integral rubber unit not only considerably reduces manufacturing costs but eliminates sources of leaks, such as seals.

Exhalation valve seats 6 are wheel-like elements having openings between the spoke-like portions thereof through which air may be exhaled in a downward direction. Central studs 7 have neck portions of reduced diameter for securing flexible rubber, flat valve discs 10, one for each valve and having outer diameters slightly greater than those of valve opening. For the sake of clarity the rubber valve discs 10 are omitted from Figure 4 but are shown in Figure 5 and denoted by numeral 10. Valve discs 10 are yieldingly held against seats 6 since the center is projected inwardly of the seat 6. The perforated central portion of the valve disc is slipped over the head and onto the neck portion of stud 7 by stretching valve disc 10 radially outwardly when mounting.

Also integrally molded with the respirator face piece and filter holder assembly are protruding rim beads 5a which surround the valve seats 6 and which are designed to protect the valves and thereby avoid the need for a detachable valve cover for this purpose. Thus the exhalation valve assembly is integrally molded and thus prevents dislodging or misfitting of parts and at the same time is very inexpensive to manufacture as compared to conventional type detachable valve seats.

Figure 6:
Figure 7:
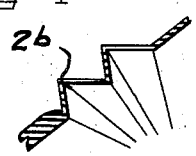
Figure 8:
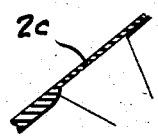
Figure 9:
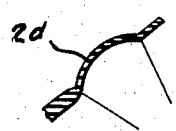

Figures 6, 7, 8 and 9 show various modifications of the thin nose pleat 2 of Figures 1 and 2. Figure 6 shows accordion pleats 2a forming an angle of about 80° in the normal extended position and being angularly disposed with respect to a horizontal line. Figure 7 shows an accordion pleat 2b which is the same as 2 and 2a except that the pleats are somewhat step-shaped and alternate leaves or elements thereof extend in a substantially horizontal direction instead of angularly in the normal wearing portion of the respirator shown in Figures 1 and 2. Figure 8 shows a still further modification wherein instead of accordion pleats, a collapsible portion 2c of considerably reduced thickness is employed and extends along substantially the same arc as pleats 2 to provide for forward flexing of the top portion of the respirator. Figure 9 shows a still further modification wherein a bulbous portion 2d of considerably reduced thickness is substituted for the accordion pleats to provide forward pivoting of the nose surrounding portion of the respirator. Similarly other designs of relatively thin portions may be employed to accomplish the forward pivotal movement of the nose surrounding part of the face piece to provide a cushion-like, air tight fit with the nose.

Figures 10, 11 and 12 show modified designs of the exhalation valve illustrated in Figure 5 and show concave valve seats 6a as well as molded concave valves 10b as distinguished from the flat molded valve discs 10 in Fig. 5. Figure 10 shows a rubber central stud 10a of spear-like shape which may be projected through the central opening of the valve seat for holding the integrally molded valve 10b against the seat. Valve 10b has an integral bead 10c around its outer (exposed) periphery, for improving the rigidity and function of rapid recovery to sealing engagement without increasing the resistance. This latter function is also made possible by providing a greater radius for the valve than for the seat, to set up a constant tension between the two. The radius of the seat may be smaller than that of the valve 10b to provide continual flexing. Instead of providing one continuous peripheral surface for the valve seat 6a a plurality of concentric rings may be employed such as in seat 13 shown in Figure 11 so that the valve disc 10b will form an air tight seal with the seat irrespective of imperfections that may be present on the valve contacting surface of the valve seat. Thus if there is a break in one of the rings due to an imperfection, the other rings will still maintain an air tight seal to prevent radial escape of air. Figures 11 and 12 both show multiple-ring, valve seats except that the rings of Figure 11 form points which contact the rubber disc 10 whereas those in Figure 12 are rounded at their points of contact. The valves are so disposed relative the respirator as to provide good condensate drainage without facial fit interference.

Figure 13 shows the shape and construction of the inhalation valve as viewed from the interior of the respirator. The inhalation valve opening or seat 9 of somewhat triangular outline, as shown, has mounted thereon a thin rubber valve 9a of substantially triangular or trapezoidal shape and of slightly larger dimension which is adapted to form a close, air-tight fit with the valve opening 9, the valve being suspended from two button retaining studs 9b which are located about 1/3 the distance from the top of the valve. Thus the thin rubber valve 9a will be normally fitted against the inhalation port 9 at all times except when the wearer inhales, at which time the thin rubber valve will flex and become drawn away from the seat to allow filtered air to enter the valve opening. The trapezoidal shape of valve opening will provide incoming air with a uniform flow pattern through the filter and into the mask, permitting it to be distributed uniformly from top to bottom of the facial fitting cavity, without permitting the valve to contact any portion of the face.

The face piece 1 may be held against the face of the wearer by means of the head band having at the ends thereof snap fasteners which may be detachably secured to snap fastener elements secured to the sides of face piece 1. However, one serious disadvantage of this type of connection is that it does not always provide a pull in the right direction for holding the face piece on the wearer's face in an air tight manner, such as in instances where the head band is worn above instead of below the ears of the wearer, or vice versa.

Figure 14 shows a self-aligning head band arrangement to overcome this objection. Two arcuate shaped wires 11 are provided with their end portions 11a imbedded in the rubber of the respirator. The ends of the head band strap 12 will be provided with hooks which fit about wires 11 and are adapted to slide along the wires so that when the rear portion of the head band is changed from above to below the ears the anchoring position of the hooks on wires 11 will change so as to provide a self-aligning feature to assure that the pull on the head band will be in the proper direction to uniformly distribute the face-contacting pressure along the margin of the face piece and thus insure a comfortable, as well as an air tight, fit of the face piece 1 on the wearer, devoid of high pressure points. Wires 11 may be bowed through a shorter radius on the top portions if desired.

Figure 16 shows a modified form of self-aligning head band wherein the ends 12a of head band 12 extend perpendicularly to the band and are slipped through integral strip portions 1a on the face piece, and are arcuate shaped to provide rocker elements so that as the head band assumes different angles relative to portions 1a the rocker 12a will rock along the edge of portions 1a to provide different points of contact and a self-aligning feature for the head band to compensate for high or low wearing of the head band.

Figures 17 and 18 show different ways for imbedding and securing the end portion of wire 11 in face piece 1 immediately adjacent rear wall 4.

Figure 19 shows the shape of the filter sheet used in the filter holder 3 of Figures 1 and 2. The sheet 16 may be of felt or similar material and is somewhat butterfly shaped and folded doubly about its central portion of minimum width and is draped over the trapezoidal, filter supporting frame 15, preferably mode of solid plastic material. The frame is preferably provided with a central, downwardly extending piece 15a to enable easy grasping of the frame when it is inserted into or removed from filter housing 3. Frame 15 has openings 15b in its base portion through which air enters the filter holder. The air then flows through both exposed trapezoidal portions of filter 16 and because of inwardly projecting spacing ribs 3a will travel about the entire space surrounding filter 16 and filtered air will eventually flow through the inhalation valve 9. Valve 9, being closely adjacent the wearer's nose, will considerably reduce breathing resistance. That is to say, the lower portion of valve sheet 9a, being immediately in front of and coextensive with the nostrils can be readily flexed and curled upwardly as the wearer inhales air.

An important feature of filter holder or housing 3 is that since it is integrally molded of rubber or similar flexible, elastic material it can expand slightly as the result of insertion of the filter holder and filter assembly so as to insure an air tight fit about the perimeter of the bottom opening of the filter holder 3. Therefore variations in dimensions of the component parts, as often occur in mass production, will be compensated for and the filter lower marginal portion will be grasped tightly by the lower marginal portion of the filter holder 3. Moreover by being of flexible rubber instead of hard plastic, holder 3 is unbreakable and more durable and has longer life.

Since the sides of filter holder 3 are closed and since only one opening is provided, namely at the bottom thereof, the length of the seal is considerably less than that of a known type of removable filter wherein the sides of the filter holder are open and require sealing engagement with the sides of the filter and filter holding frame. Furthermore it permits easier and more fool-proof insertion of the filter, aligning it in sidewise position when assembled, therefore preventing leakage.

Figure 3:
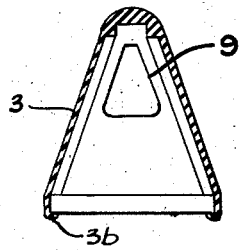
Figure 3 is a cross-sectional view in reduced scale taken along line III—III of Figure 2.

The filter 16 shown in Figure 20 may be made oversize as compared to the width of corresponding parts of the filter holder 3, so that upon insertion, will become inwardly bowed away from the front and rear housing walls of the filter housing 3 to provide a more ideal air flow pattern, and eliminate the need of additional filter housing spacer ridges. Also with the larger filter area and resultant air flow pattern, the inhalation resistance is lowered and the useful filter life is appreciably increased. To achieve simplicity in assembly, inwardly projecting rubber flanges 3b are provided along a portion of the sides at the bottom opening of filter housing 3 (see Fig. 3) to retain the filter frame or insert and the filter in tight sealing engagement with filter housing 3.

Instead of a single inhalation valve, a pair may be used, and instead of a pair of exhalation valves, a single one may be used, if desired.

Thus it will be seen that I have provided a highly efficient, flexible, form fitting respirator which can be integrally molded as one single piece of flexible material, such as rubber, to form not only the face piece but the filter holder or housing and retaining stops, as well as the inhalation and exhalation valve seats, which one piece molded structure considerably reduces manufacturing costs as well as eliminates the need for close manufacturing tolerances required for making these parts as separate units, also it eliminates leakage inherent from the usually imperfect fit of separate instead of integral parts; furthermore I have provided an extremely comfortable cushion-like fit of the face piece irrespective of varying facial contours and nasal contours of different wearers, obtained by pleating the nose surrounding portion, by abruptly reducing the thickness of the outwardly turned marginal edge and by providing a self-aligning head band; furthermore I have provided a reliable inhalation valve and exhalation valve assembly, whose seats are integrally molded for assuring an air tight seal and for considerably reducing resistance to breathing of the wearer; also I have provided a flexible filter holder which will expand upon insertion of the filter and supporting frame so as to insure an air tight fit with the filter and eliminate any tendency of leakage, as well as to provide an improved air flow pattern, reduce breathing resistance and increase filtering efficiency.

While I have illustrated and described several embodiments of my invention, it will be understood that these are by way of illustration only, and that various changes and modifications may be made within the contemplation of my invention and within the scope of the following claims.

I claim:

1. A respirator comprising a face piece of substantially triangular and cup shape having integrally molded therewith a filter holder housing of flexible material and of similar shape but of smaller dimension, the top portion of the filter holder housing being disposed below the top portion of the face piece, projecting straps emerging from the face piece alongside the side walls of the filter holder, a head band having end portions which are arcuately shaped, each adapted to rock along one side of one of said straps so that the point of rolling contact will vary in accordance with variations of the direction of pull on said head band so as to equalize the contact pressure about the perimeter of the face piece to insure a comfortable and uniformly air tight seal with the face of the wearer.

2. A respirator comprising a one piece, integrally molded face piece and filter holder housing of rubber-like elastic material, the housing projecting forwardly of the face piece and having downwardly and outwardly disposed, completely closed side walls and an open bottom wall for receiving a filter and filter holding frame, said housing having a rear wall and a bottom wall integrally molded with and extending laterally rearwardly from said rear wall, said bottom wall having a circular, concave exhalation valve seat and a corresponding concave valve disc seated thereon, said valve disc having an integral peripheral bead projecting from its exposed surface.

References Cited in the file of this patent

UNITED STATES PATENTS

| | | |
|---|---|---|
| 1,317,947 | Soderling | Oct. 7, 1919 |
| 1,718,350 | Greenwald | June 25, 1929 |
| 2,079,581 | Whipple | May 4, 1937 |
| 2,112,213 | Schwartz | Mar. 22, 1938 |
| 2,216,619 | Lehmberg | Oct. 1, 1940 |
| 2,220,374 | Lewis | Nov. 5, 1940 |
| 2,341,566 | Monro | Feb. 15, 1944 |
| 2,383,364 | Yant | Aug. 14, 1945 |
| 2,534,720 | Loose | Dec. 19, 1950 |
| 2,591,953 | MacLean | Apr. 8, 1952 |
| 2,706,983 | Matheson et al. | Apr. 26, 1955 |
| 2,751,904 | Lewis | June 26, 1956 |